G. L. COLLORD.
BLAST FURNACE CHARGING APPARATUS.
APPLICATION FILED DEC. 19, 1906.
967,328.
Patented Aug. 16, 1910.
2 SHEETS—SHEET 1.
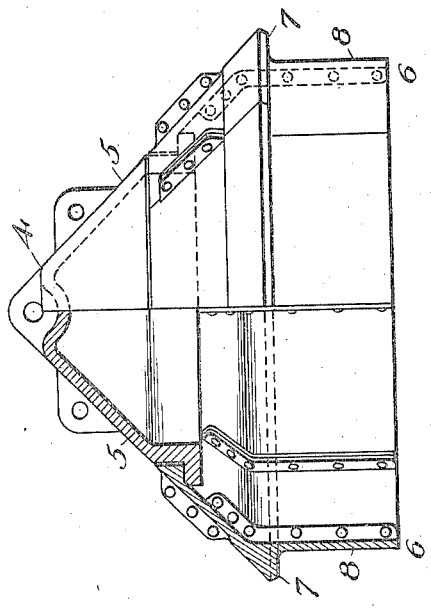
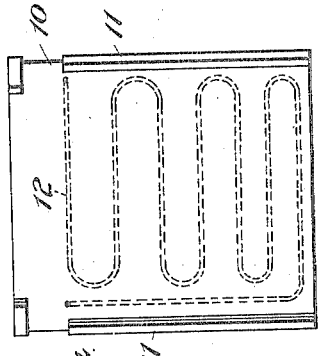
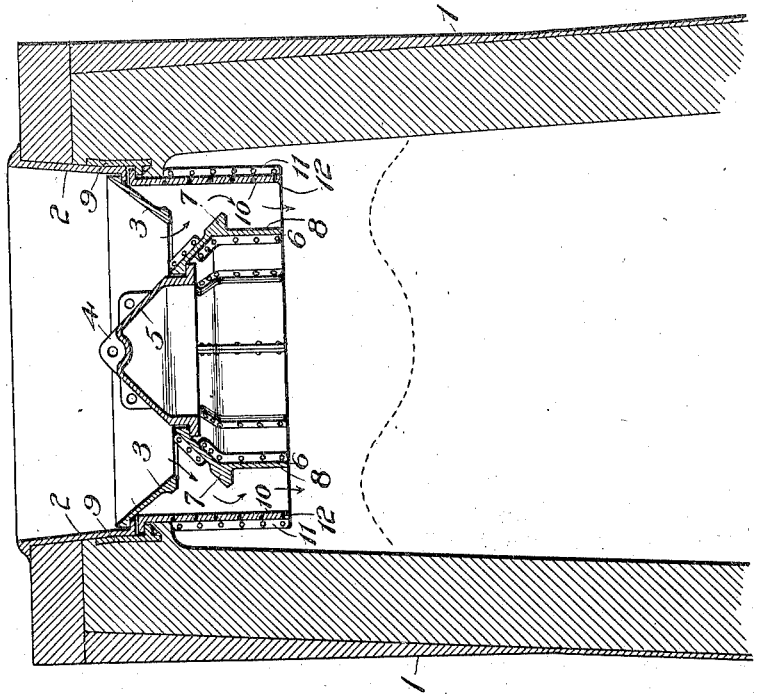
Witnesses
Edwin L. Bradford
P. H. Burch
Inventor
George L. Collord
By
Robert Johnston Jr.
Attorney G. L. COLLORD.
BLAST FURNACE CHARGING APPARATUS.
APPLICATION FILED DEC. 19, 1906.

967,328.

Patented Aug. 16, 1910.
2 SHEETS—SHEET 2.

Witnesses
Edwin L. Bradford
P. H. Burch

Inventor
George L. Collord
By
Attorney

UNITED STATES PATENT OFFICE.

GEORGE L. COLLORD, OF BIRMINGHAM, ALABAMA.

BLAST-FURNACE-CHARGING APPARATUS.

967,328.  Specification of Letters Patent.  Patented Aug. 16, 1910.

Application filed December 19, 1906. Serial No. 348,632.

*To all whom it may concern:*

Be it known that I, GEORGE L. COLLORD, a citizen of the United States, residing at Birmingham, in the county of Jefferson and State of Alabama, have invented new and useful Improvements in Blast-Furnace-Charging Apparatus, of which the following is a specification.

My invention relates to blast furnace charging apparatus designed to produce in a novel manner the most desirable and uniform distribution of the stock in the furnace.

Primarily I desire to avoid the disadvantages attendant upon a distribution of the stock which causes the finer material to accumulate against the furnace walls while the lumps fall to the center. Under such conditions the gases will not act uniformly throughout the stock and many serious disadvantages in operation result.

I have conceived that if the charging apparatus be designed to cause the stock to fall therefrom directly and vertically into the furnace instead of being deflected from the bell or furnace walls so that it falls obliquely, that the desired distribution thereof may be obtained uniformly and irrespective of the height of the stock in the furnace. It will be noted that the vertical fall of the stock affords the maximum protection to the furnace walls.

In operation, according to my preferred arrangement, when the bell is lowered the stock falls from the hopper through a distributing passage formed between two guide walls which are preferably concentric and drops in an annular body straight downwardly, thereby forming an annular wave or ridge of stock concentric with the furnace walls and spaced therefrom sufficiently to permit the lumps to fall both to the center and against the walls, thereby affording the best conditions for the uniform action of the gases throughout the stock. Obviously the mechanism for obtaining this vertical charging of the stock may be widely varied and it may be adapted to produce any desired distribution, but I prefer to use what is known as the double wave distribution. I have illustrated my invention in the accompanying drawings designed to that end.

Figure 5:
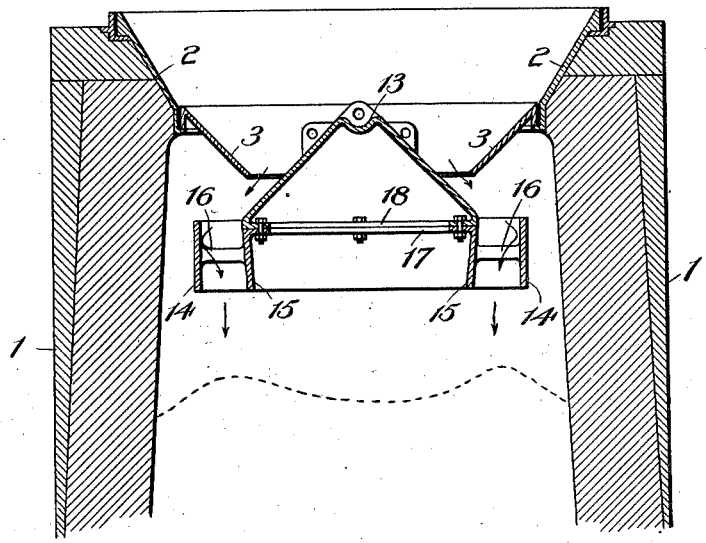
Figure 6:
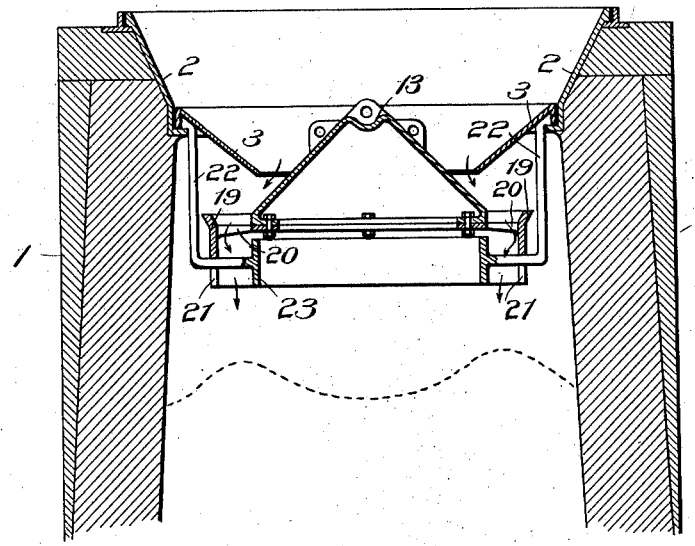

In the drawings:—Figure 1, illustrates a vertical central sectional view through the upper portion of a blast furnace, equipped with my invention in its preferred form, and illustrated with the bell lowered. Fig. 2, is an enlarged vertical sectional view of the charging bell. Fig. 3, is a top plan view, and Fig. 4, an outside elevation of one of the sections of the outer deflector wall. Fig. 5, is a view corresponding to Fig. 1 and illustrates a modification of my invention in which both deflector walls are attached to and movable with the bell. Fig. 6, illustrates a further modification in which the inner deflector wall is supported from the furnace while the outer deflector wall is connected to and movable with the bell.

Similar reference numerals refer to similar parts throughout the specification.

The furnace 1 may be of any standard construction and provided with either a single or double hopper. According to my invention as illustrated in Fig. 1, I use an inclined hopper 2 having a charging extension 3 with a closing bell 4 therefor. This bell comprises a solid conical apex 5 shouldered around its base to receive a sectional extension 6 formed by bolting a number of sections 7 together. Each section 7 comprises a segment of the extension 6 and of an apron or inner deflector wall 8 which depends from the bell. I provide a plurality of metal strips 9 keyed to the hopper 2 and angled at their lower ends to receive a plurality of water cooled curved plates 10 which abut to form the outer deflector wall. The sections forming the inner and outer deflector walls are provided with flanges 11 along their abutting edges by means of which they are bolted together. If desired they may be formed integrally and in like manner the bell may be formed in one piece, but a sectional construction is used preferably. Each section 10 of the outer deflector wall has a coiled pipe 12 cast therein and suitably connected with water circulation pipes for the purpose of keeping the outer deflector wall cool and preventing warping.

It will be noted that the outer deflector wall extends well down into the furnace and to a point substantially even with the inner deflector wall 8 when the bell is lowered. The purpose of this is to cause the stock, as the bell is lowered, to fall between the inner and outer deflector walls and be guided by them, substantially as indicated by the arrows and straight down into the furnace. As illustrated, the inner and outer deflector walls are parallel. This, however, is not essential to my invention as either or both of the walls may be slightly angularly disposed to each other when such angular disposition tends to produce a substantially vertical fall of the stock as contrasted with the oblique discharge of the stock which is obtained from constructions now in use.

In Fig. 5, I have illustrated a modification of my invention in which the bell 13 carries both deflector walls 14 and 15, the outer deflector being connected by webs 16 to the inner deflector wall which slightly converges inwardly toward its bottom edge and is provided with a flange 17 which is bolted to a flange 18 on the bell. As the stock is deflected from the outer wall it strikes the inner wall, and is deflected again downwardly in a substantially vertical line.

In Fig. 6, I illustrate a further modification of my invention in which the bell 13 has only the outer deflector 19 connected thereto by webs 20 bolted to the bell flange 18. This outer deflector is slotted at 21 to receive the angled arms 22 which are connected to the hopper extension 3 and support the inner deflector 23. The stock may be charged into the hopper in any desired manner and the bell operated in any manner as now practical.

In accordance with the patent statutes, I have shown and described apparatus illustrating my invention, but do not desire to be limited to the detail construction of the same.

What I claim as new and desire to secure by Letters Patent, is:—

1. In a blast furnace charging apparatus, a hopper, a closing bell therefor, and a pair of substantially vertically disposed deflectors which receive and direct the discharge of the stock into the furnace, one of said deflectors being movable with the bell.

2. In a blast furnace charging apparatus, a hopper, a closing bell therefor, an outer annular deflector spaced from the walls of the furnace and supported by the upper portion of the furnace, and an inner opposing deflector carried by and disposed below the bell.

3. In a blast furnace charging apparatus, a vertically movable bell having an annular deflector which depends therefrom and which does not exceed the bell in diameter in combination with an outer fixed deflector which co-acts with said movable deflector, substantially as described.

4. In a blast furnace charging apparatus, a hopper, a bell for closing said hopper, an outer annular deflector supported by the furnace, and an inner annular deflector carried by the bell, a vertical guide passage for the stock being formed between said deflector walls, substantially as described.

5. In a blast furnace charging apparatus, a hopper, a closing bell therefor having an integral apex and a sectional extension, a sectional inner deflector wall carried by said bell, and a sectional outer deflector wall connected to the furnace, said deflector walls forming a substantially vertical distributing passage way for the stock.

6. In a blast furnace charging apparatus, the combination with a hopper and a closing bell therefor, of an outer sectional stationary deflector which depends into the furnace, means to water cool the sections of said deflector, and an inner deflector movable with the bell and adapted to co-act with the outer deflector in distributing the charge in the furnace.

7. In a blast furnace charging apparatus, a hopper, a closing bell therefor, an outer annular stationary deflector, an inner deflector movable with the bell and standing opposed to said outer deflector so as to form an annular directing passage from which the stock falls in an annular body in a substantially vertical line into the furnace.

In testimony whereof I have hereunto set my hand in presence of two subscribing witnesses.

GEORGE L. COLLORD.

Witnesses:
  H. H. GOLDSTEIN,
  NOMIE WELSH.